Figure 1:
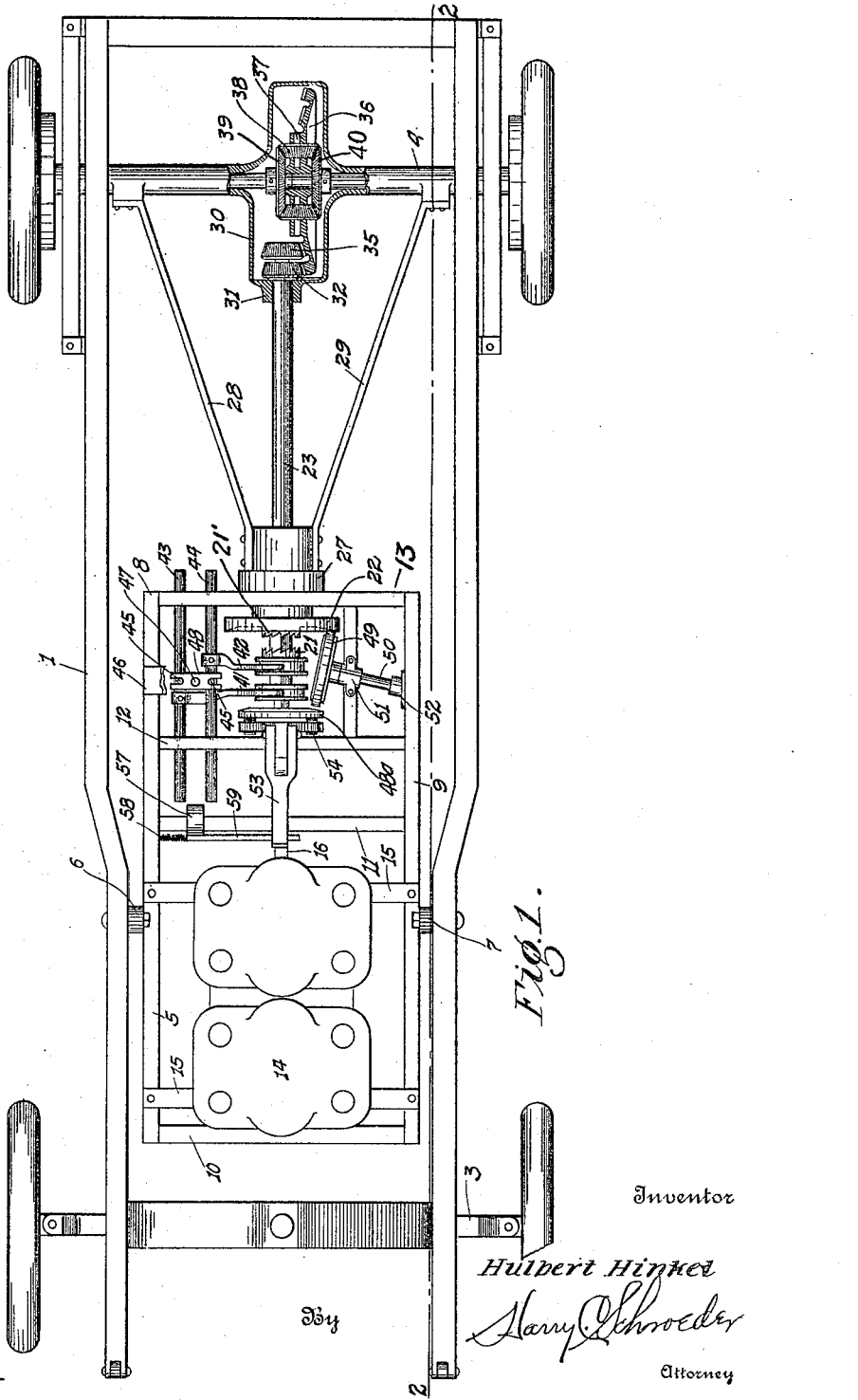

H. HINKEL.
TRANSMISSION MECHANISM.
APPLICATION FILED MAR. 20, 1913.
1,195,138.
Patented Aug. 15, 1916.
2 SHEETS—SHEET 2.
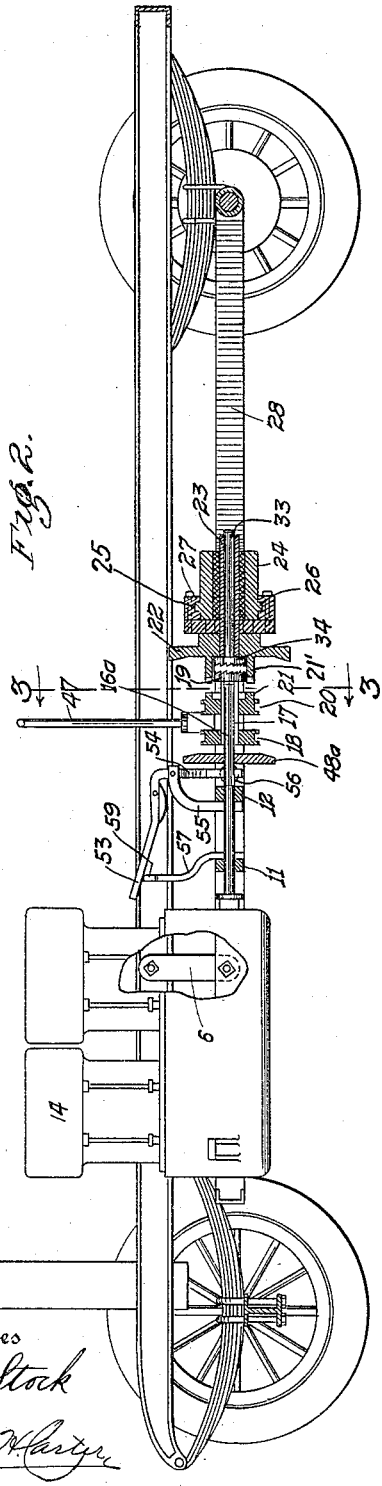
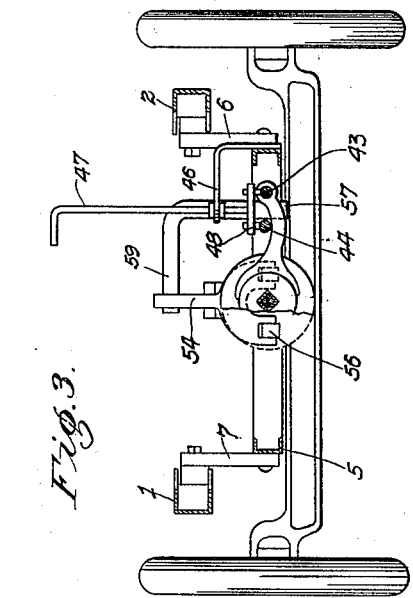
Inventor
Hulbert Hinkel

UNITED STATES PATENT OFFICE.

HULBERT HINKEL, OF OAKLAND, CALIFORNIA.

TRANSMISSION MECHANISM.

1,195,138. Specification of Letters Patent. Patented Aug. 15, 1916.

Application filed March 20, 1913. Serial No. 755,682.

*To all whom it may concern:*

Be it known that I, HULBERT HINKEL, a citizen of the United States, residing at Oakland, in the county of Alameda and State of California, have invented certain new and useful Improvements in Transmission Mechanism, of which the following is a specification.

This invention relates to automobile transmission mechanism.

The principal object of my improved device is to provide a simple and efficient drive particularly adapted to light weight automobiles. This I accomplish by providing an extra bevel gear on the differential and providing two drive shafts from the engine either of which may be used to drive the main gear of the differential. As the ratio of the two pinions which drive the differential is not the same, two speeds are thus obtained.

Another object is to provide means whereby the reverse cannot be thrown on at the same time as the forward device, and vice versa.

A further object resides in the particular arrangement and combination of parts hereinafter described.

The means by which these objects are accomplished will be fully set forth in the following specification and illustrated in the drawings forming a part thereof.

In the drawing Figure 1 is a view in plan, parts being broken away, of an automobile chassis, showing my improvements attached thereto. Fig. 2 is a longitudinal sectional view of the chassis shown in Fig. 1 taken on line 2—2. Fig. 3 is a transverse section view on line 3—3 of Fig. 2 looking in the direction of the arrows.

Referring more particularly to the drawings, 1 and 2 are the side members of the automobile framework which is spring supported from the front axle 3 and rear axle 4. 5 denotes a subframe which is pivotally supported from the side members 1 and 2 by links 6 and 7. The subframe consists of the longitudinally extending bars 8 and 9, which are connected by the cross members 10, 11, 12 and 13. The engine 14 is mounted on this subframe by means of arms 15—15. The crank shaft 16 of this engine extends rearwardly and is journaled in the frame members 11 and 12. Between the members 12 and 13 the section of this shaft is changed from circular to square as shown at 16ª (Fig. 2) or in place thereof, a spline or feather key may be provided. Slidably mounted on this portion of the shaft is a sleeve 17 which also has a square aperture and section. To one end of this sleeve is attached a grooved collar 18 and to the other end is attached a clutch disk 19. Sliding on the outside of the sleeve 17 is a second grooved collar 20, which is provided on its side with the clutch member 21. This latter member is arranged to be thrown into contact with a similar clutch member 21′ forming a part of the friction disk 22. This disk 22 is keyed to a sleeve 23 which is journaled in the bearing 24. The bearing is provided with an annular rib 25 which is seated in a corresponding annular recess 26 in a split ring 27, which ring is bolted or otherwise attached to the frame member 13. This connection enables the frame and subframe to turn about this bearing, which is rigidly connected to the axle by means of the diagonally disposed bars 28 and 29.

Sleeve 23 extends rearwardly from the bearing 24 to the differential housing 30 where it is journaled as at 31. Within the housing a bevel pinion 32 is keyed to the end of this sleeve. Revolubly mounted in the sleeve 23 is a shaft 33 the forward end of which is provided with a face clutch 34 arranged to engage the teeth of clutch 19 and the rear end of this shaft extends into the differential housing and is there provided with a bevel pinion 35. Bevel pinions 32 and 35 are in running engagement with corresponding tooth gears 36 both being integral with the spider 37. This spider is revolubly mounted on the rear axle and connected to the two halves of the axle in a preferred manner. As here shown the small gears 38 are pivotally mounted in the spider frame 37, and mesh with gears 39 and 40 mounted respectively on the two halves of the axle shaft. A longitudinal movement is imparted to the grooved collars 18 and 20 by means of the shipper yokes 41 and 42. These latter are in turn attached to the sliding bars 43 and 44 mounted in the frame members 12 and 13. Each of these bars is provided with a vertically extending pin 45. Mounted on the side of frame 5 is a bracket arm 46 in which is journaled a shifting rod 47, on the lower end of which is attached a bar 48. This bar is slotted on each end and the said slots engage pins 45. Mounted in front of grooved wheel 18 is a second friction disk 48ᵃ which is slidable along the squared portion of the shaft 16.

In engagement with the friction disk 22 is an idler wheel 49 which is keyed to the shaft 50. This shaft is journaled to bearings 51 and 52 and in order to throw the friction disk 48ᵃ into contact with the idler wheel 49, there is provided the device which consists of a foot lever 53 attached to a yoke 54 in such a manner that the foot lever operates the yoke when turned downwardly but pivots thereon when turned upwardly. This yoke is pivotally mounted in a forked bar 55 attached to the member 12. The lower end of yoke 54 is provided with rollers 56 which bear against the back of friction disk 48ᵃ, thus by pressing down on the foot lever 53 the latter is caused to bear against the idler wheel 49 which in turn bears against friction disk 22 and thus causes this disk to move in a reverse direction. To prevent the reverse and forward drives from being thrown on at the same time, I provide an auxiliary lever 57 pivotally mounted on bar 11 adjacent to the ends of bars 43—44 so that it may rock in a vertical plane transverse to the frame member 1. This lever is normally held in a vertical position by spring 58 so that it lies forward of and midway between the ends of bars 43—44 which are free to move past the same. Now it is apparent from the connections between bars 43 and 44 that they move in opposite directions and an extension 59 is provided which rests under the foot lever 53. Thus when the latter is pressed downward the vertical portion 57 is moved over into the path of bar 44 and thus prevents movement of the latter in one direction. Or if this bar has been moved from its central position toward the left as shown in Fig. 1, the lever 53 cannot be moved, which prevents the foot lever from being depressed.

As shown in the drawings, my device is in its central position and the engine runs free. If the rod 47 is turned in a counterclockwise direction, as shown in Fig. 1, then clutches 21 and 21′ are thrown into engagement and sleeve 23 is rotated which drives on low speed. By turning the lever in the reverse direction, clutches 19 and 34 are engaged which drives shaft 33 and pinion 35 thus giving a higher speed.

If a reverse is desired, the rod 47 is placed in its central position and lever 57 depressed which cause the rollers to press against disk 48ᵃ transmitting the motion from this disk through idler 49 to disk 22 and through sleeve 17 to gear 32.

It will be apparent from the connections previously described that the reverse cannot be thrown on while the gears are in high speed position. However, if it is attempted to operate the reverse when on the low speed, the only effect will be to slip the idler 49 against the friction disk 22, the latter is then being positively driven by the clutch member 21 and 21′. If the reverse were thrown on when the high speed clutch were in, however, opposing torques would be transmitted to spider 37 with danger of stripping the teeth on gears 36 or on the pinions 32 and 35 or both.

Particular attention is directed to the bearing 24 which enables the subframe and supported parts to turn about the shaft 33 and yet maintains this shaft and the crank shaft in alinement.

It will be understood by those skilled in the art that while the preferred forms of my improvements are given in the attached drawings and described in the foregoing specification, that various modifications and arrangements thereof may be made without departing from the spirit of my invention.

Having thus described my invention, what I claim is:—

1. A transmission mechanism comprising in combination a driving shaft, a two-speed bevel gear, a hollow driven shaft, a driven shaft therein, bevel gears secured to one end of said driven shafts and adapted to engage said two-speed bevel gear, clutch members secured to the other end of each of said driven shafts, clutch members slidably and non-rotatably mounted on said driving shaft, disks adapted to be locked to said driving shaft by said clutch members one at a time, means co-acting with said disks serving to actuate one of said driven shafts.

2. A transmission mechanism comprising in combination a driving shaft, a pair of driven shafts normally out of engagement with said driving shaft, said driven shafts contained one within the other, bevel gears secured to one end of each of said driven shafts, a disk having two sets of annular bevel teeth formed on the face thereof adapted to operatively engage said driven bevel gears, clutching elements secured to the other end of said driven shafts, a disk and clutching elements slidably and non-rotatably mounted on said driving shaft, a disk formed on said hollow driven shaft adjacent said clutching elements, and means intermediate said disks normally out of engagement adapted to co-act to drive one of said driven shafts.

In testimony whereof I affix my signature in presence of two witnesses.

HULBERT HINKEL.

Witnesses:
 FRANK H. CARTER,
 S. NELSON.